United States Patent
Frenger et al.

(10) Patent No.: US 10,383,040 B2
(45) Date of Patent: Aug. 13, 2019

(54) METHODS AND ARRANGEMENTS FOR MANAGING ACCESS INFORMATION ENABLING A WIRELESS DEVICE TO ACCESS A WIRELESS COMMUNICATION NETWORK

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/558,790

(22) PCT Filed: Mar. 24, 2015

(86) PCT No.: PCT/SE2015/050352
§ 371 (c)(1),
(2) Date: Sep. 15, 2017

(87) PCT Pub. No.: WO2016/153399
PCT Pub. Date: Sep. 29, 2016

(65) Prior Publication Data
US 2018/0077632 A1    Mar. 15, 2018

(51) Int. Cl.
*H04W 48/16* (2009.01)
*H04W 48/06* (2009.01)
(Continued)

(52) U.S. Cl.
CPC ........... *H04W 48/16* (2013.01); *H04W 28/02* (2013.01); *H04W 48/06* (2013.01);
(Continued)

(58) Field of Classification Search
CPC ..... H04W 48/16; H04W 28/02; H04W 74/00; H04W 74/0833; H04W 48/06;
(Continued)

(56) References Cited

U.S. PATENT DOCUMENTS

2005/0027949 A1   2/2005  Iwamori et al.
2014/0295836 A1*  10/2014 Frenger ............... H04W 74/006
                                                455/434
(Continued)

FOREIGN PATENT DOCUMENTS

EP    2136483 A1    12/2009
JP    2011504689 A   2/2011
(Continued)

OTHER PUBLICATIONS

Frenger, Pal et al., "From Always Available to Always Optimized", Towards 5G-5Green System Design, XP055186153, Aug. 27, 2014, pp. 1-28.
(Continued)

*Primary Examiner* — Raymond S Dean
(74) *Attorney, Agent, or Firm* — Murphy, Bilak & Homiller, PLLC

(57) ABSTRACT

A first network node (110, 130) provides access information enabling a wireless device (120) to access a first wireless communication network (100). The first radio network node provides (301; 801) a first access identifier (402; 502; 602; 702) and a first access information compilation (401; 501; 601; 701) identified by the first access identifier (402; 502; 602; 702). The first access information compilation (401; 501; 601; 701) identifies access information that enables the wireless device (120) to access the first wireless communication network (100) through a first radio network node (110). The first access information compilation (401; 501; 601; 701) identifies where to receive another, further access
(Continued)

information compilation (411; 511a-b, 521; 611, 621; 711, 721) that comprises at least part of said access information and is associated with a transmission on a different frequency and/or at a different time than the first access information compilation (401; 501; 601; 701).

32 Claims, 8 Drawing Sheets

(51) Int. Cl.
  *H04W 52/02* (2009.01)
  *H04W 28/02* (2009.01)
  *H04W 56/00* (2009.01)

(52) U.S. Cl.
  CPC ... *H04W 52/0216* (2013.01); *H04W 52/0219* (2013.01); *H04W 52/0229* (2013.01); *H04W 56/0015* (2013.01); *Y02D 70/1222* (2018.01); *Y02D 70/1242* (2018.01); *Y02D 70/1244* (2018.01); *Y02D 70/1246* (2018.01); *Y02D 70/1262* (2018.01); *Y02D 70/21* (2018.01)

(58) Field of Classification Search
  CPC ......... H04W 52/0216; H04W 52/0219; H04W 52/0229; H04W 56/0015; Y02D 70/21; Y02D 70/1222; Y02D 70/1242; Y02D 70/1244; Y02D 70/1246; Y02D 70/1262
  USPC ...................... 455/3.01, 3.06, 3.04
  See application file for complete search history.

(56) References Cited

U.S. PATENT DOCUMENTS

| | | | |
|---|---|---|---|
| 2016/0262088 A1* | 9/2016 | Frenger | H04W 74/0833 |
| 2017/0353915 A1* | 12/2017 | da Silva | H04W 48/18 |
| 2018/0035358 A1* | 2/2018 | Frenger | H04W 48/10 |
| 2018/0063772 A1* | 3/2018 | Wang | H04W 48/12 |

FOREIGN PATENT DOCUMENTS

| | | |
|---|---|---|
| RU | 2010117187 A | 11/2011 |
| WO | 2009065041 A1 | 5/2009 |
| WO | 2013022512 A1 | 2/2013 |
| WO | 2014069058 A1 | 5/2014 |
| WO | 2014162205 A2 | 10/2014 |

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol Specification (Release 12)", 3GPP Draft 36331-C50, Mobile Competence Centre; 650, Route des Lucioles; France, Mar. 15, 2015, pp. 1-402.

Unknown, Author, "5G—Key Component of the Networked Society", RWS-150009, 3GPP RAN Workshop on 5G, Phoenix, Arizona, USA, Sep. 17-18, 2015, pp. 1-55.

Frenger, Pål et al., "A Clean Slate Radio Network Designed for Maximum Energy Performance", 2014 IEEE 25th Annual International Symposium on Personal, Indoor, and Mobile Radio Communication (PIMRC), Sep. 2, 2014, 1300-1304.

* cited by examiner ns. In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

METHODS AND ARRANGEMENTS FOR MANAGING ACCESS INFORMATION ENABLING A WIRELESS DEVICE TO ACCESS A WIRELESS COMMUNICATION NETWORK

TECHNICAL FIELD

Embodiments herein relate to methods and network nodes in a wireless communication network, e.g. telecommunication network, for managing access information enabling a wireless device to access a wireless communication network through a radio network node.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Work is ongoing with designing a baseline for the next generation wide area networks, which may be referred to as fifth generation (5G). To reduce energy consumption in the network and to fully enable utilizing high gain beam forming or other multi-antenna techniques a concept has been defined separating the control/broadcast layer from the data plane. The broadcast layer comprises a broadcasted Access Information Table (AIT) and a broadcasted System Signature Sequence (SSS). See e.g. P. Frenger, M., Olsson, and E. Eriksson, "A clean slate radio network designed for maximum energy performance," in Proc. IEEE PIMRC 2014. FIG. 1a is a time-frequency diagram schematically illustrating how AIT and SSS can relate to each other. The SSS may be used to map information from a broadcasted AIT. The broadcasted signals should be able to send in a Single Frequency Network (SFN) structure. Broadcasted information may contain parameter settings related to how to access the system, through random access, and be reached by the system, by means of so called paging. An AIT provides initial access related parameters for one or multiple areas. To reduce network energy consumption, the broadcasted signals are infrequent compared to reference signals in previous cellular systems, such as LTE. The AITs are typically transmitted with long periodicity, e.g. from 1.024 s up to 10.24 s.

FIG. 1b is a block diagram schematically depicting an example of a wireless communication network employing AITs and SSSs, such as discussed above and shown in FIG. 1a. In general, SSSs may not be node specific, instead one SSS may provide relevant access information for several nodes, as shown in the figure where small, e.g. pico, cells are associated with a $SSS_3$ and larger, e.g. macro, cells covering the small cells, are associated with a $SSS_{15}$. The larger cells may transmit access information related to the small cells. In order to enhance mobility, an AIT may contain access information related to adjacent areas. The system signature sequences provide time synchronization as well as a mapping to a table entry in the AIT. Typically SSSs are transmitted more often than AITs, e.g. every 100 ms.

In general, AITs and SSSs' are transmitted relatively seldom in time and frequency compared to conventional cellular systems. Some nodes may transmit both an AIT and an associated SSS, while some nodes only transmit an SSS.

A SSS may be similar, i.e. may be considered to correspond, to an LTE synchronization signal. Assuming that there are a total of 1024 possible SSSs then they can convey 10 bits of information. A received SSS-index is used for deriving access information from the AIT and received power used for layer selection and open-loop power control. The timing of a received SSS may be used for determining a Physical Random Access Channel (PRACH) transmission timing window.

It is realized that a wireless communication network, e.g. a 5G network, based on broadcasted AITs and SSSs as described above, has some advantages over existing, conventional wireless communication networks and conventional Radio Access Technologies (RATs), such as LTE, but that it is also faces challenges. For example, it is clearly advantageous that reduction of interfering and energy consuming signalling is enabled, e.g. reference signalling and signalling of various system information and the like. On the other hand, access to this information is often crucial. Any problem in accessing the "right", desired information when it is need may impair performance. Worsened performance in any way compared to conventional wireless communication networks, will likely not be acceptable. The perhaps most crucial information is access information enabling a wireless device to access the wireless communication network through a radio network node.

Hence, it desirable that further development of and solutions for wireless communication systems, e.g. 5G networks, and that e.g. are supporting use of AITs and SSS as described above, reduces, or at least enable or facilitate reduction of, risks for performance degradation or other drawbacks, in particular with regard to access information, in relation to conventional wireless communication networks. At the same time it is of course desirable to also provide further advantages.

SUMMARY

An object is to provide one or more improvements with regard to provision of access information enabling a wireless device to access a wireless communication network.

According to a first aspect of embodiments herein, the object is achieved by a method, performed by first network node, for providing access information enabling a wireless device to access a first wireless communication network through a first radio network node comprised in the first wireless communication network. The first network node provides a first access identifier and a first access information compilation. The first access identifier identifies the first access information compilation. The first access information compilation identifies access information that enables the wireless device to access the first wireless communication network through the first radio network node. The first access information compilation identifies where to receive another, further access information compilation that comprises at least part of said access information and is associated with a transmission on a different frequency and/or at a different time than the first access information compilation.

According to a second aspect of embodiments herein, the object is achieved by a computer program comprising instructions that when executed by a processing circuit causes the first network node to perform the method according to the first aspect.

According to a third aspect of embodiments herein, the object is achieved by a data carrier comprising the computer program according to the second aspect.

According to a fourth aspect of embodiments herein, the object is achieved by a method, performed by a wireless device, for obtaining access information enabling the wireless device to access a first wireless communication network through a first radio network node. The first radio network node is comprised in the first wireless communication network. The wireless device receives, from the first radio network node, a first access identifier and a first access information compilation which are transmitted on a first frequency by the first radio network node. The first access identifier identifies the first access information compilation. The first access information compilation identifies access information that enables the wireless device to access the first wireless communication network through the first radio network node. The first access information compilation identifies where to receive another, further access information compilation that comprises at least part of said access information and is associated with a transmission on a different frequency and/or at a different time than the first access information compilation.

According to a fifth aspect of embodiments herein, the object is achieved by a computer program comprising instructions that when executed by a processing circuit causes the wireless device to perform the method according to the fourth aspect.

According to a sixth aspect of embodiments herein, the object is achieved by a data carrier comprising the computer program according to the fifth aspect.

According to a seventh aspect of embodiments herein, the object is achieved by a first network node for providing access information enabling a wireless device to access a first wireless communication network through a first radio network node comprised in the first wireless communication network. The first network node is configured to provide a first access identifier and a first access information compilation. The first access identifier identifies the first access information compilation. The first access information compilation identifies access information that enables the wireless device to access the first wireless communication network through the first radio network node. The first access information compilation identifies where to receive another, further access information compilation that comprises at least part of said access information and is associated with a transmission on a different frequency and/or at a different time than the first access information compilation.

According to an eight aspect of embodiments herein, the object is achieved by a wireless device for obtaining access information enabling the wireless device to access a first wireless communication network through a first radio network node comprised in the first wireless communication network. The wireless device is configured to receive, from the first radio network node, a first access identifier and a first access information compilation which are transmitted on a first frequency by the first radio network node. The first access identifier identifies the first access information compilation. The first access information compilation identifies access information that enables the wireless device to access the first wireless communication network through the first radio network node. The first access information compilation identifies where to receive another, further access information compilation that comprises at least part of said access information and is associated with a transmission on a different frequency and/or at a different time than the first access information compilation.

Embodiments herein thus involve that the first access information compilation, e.g. first AIT, identifies how to access, i.e. points to, the further access information compilation that comprises at least part of the access information identified by the first access information compilation. This enables a flexible framework for providing information, e.g. access information and other system related information, to wireless devices, and for the wireless devices to obtain the same information. Improvements and advantages thanks to embodiments herein e.g. include:
- reduction of the need for different AITs with virtually the same information,
- facilitated update and change of AIT information and making sure that AIT information is consistent within the involved wireless communication network(s),
- enabling to broadcast different AIT information to different wireless devices,
- reduction of the amount of information needed to be broadcasted on different frequencies at virtually the same time and thus enabling reduction of interference in the network,
- enabling better control and flexibility of what information is broadcasted and e.g. is duplicated or not,
- enabling provision of improved decision making information to wireless devices, e.g. about several cells provided by multiple radio network nodes, before attempting to access a wireless communication network through any of these radio network nodes.

BRIEF DESCRIPTION OF THE DRAWINGS

Examples of embodiments herein are described in more detail with reference to the appended schematic drawings, which are briefly described in the following.

DETAILED DESCRIPTION

Figure 1A:
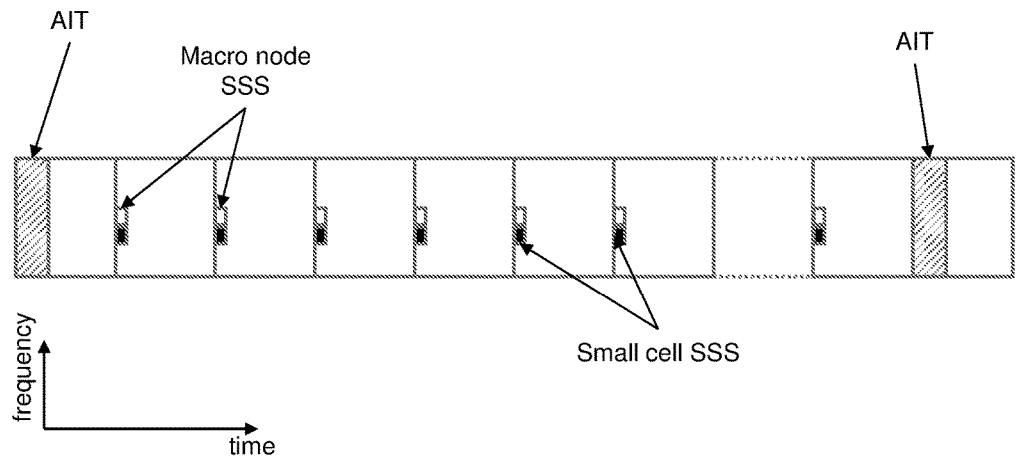
FIG. 1a is a time-frequency diagram schematically illustrating how Access Information Tables (AITs) and System Signature Sequences (SSSa) may relate to each other.
Figure 1B:
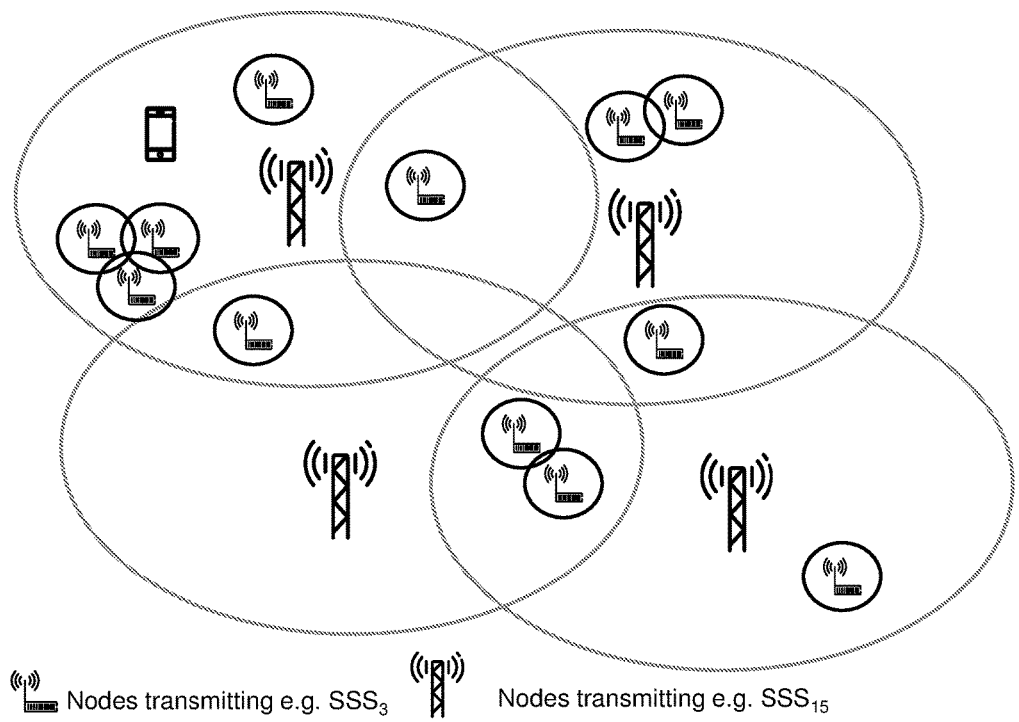
FIG. 1b is a block diagram schematically depicting an example of a wireless communication network employing AITs and SSSs.

Several problems associated with the use of multiple AITs or similar, as described in the Background, have been identified, e.g.:
- Information content of different AITs must be kept consistent although the information is distributed.
- When changing AIT content it may not be possible to change the content in all AITs at the same time, where the AITs may be on different frequency bands, transmitted at different time instances and with different periodicity.
- Multiple AITs create uncertainties about which AIT a particular wireless device has received and hence it may be difficult to know when a particular wireless device has detected a change in the access information.
- In a multi-stakeholder, e.g. multiple operator, scenarios, a stakeholder, e.g. first operator, may not control all network nodes and hence it may not be possible to update a particular AIT transmitted from another network node controlled by another stakeholder, e.g. second operator. In a multi-operator scenario it may be desirable to broadcast different AI to different wireless devices. Having only an operator identity list, e.g. a PLMN_ID list, included in the AIT limits this possibility.
- In a multi-RAT scenario it may be desirable to provide AIT content on another RAT. In that case it cannot be taken for certain that a wireless device will discover this without any help from the network since that could increase the time it takes to acquire system information and hence result in bad performance.
- Prior art AITs and SSSs makes it difficult to provide different parts of the information in a AIT from different sources, e.g. from different nodes, different frequency bands, or RATs. Such information may e.g. be "time and date reference" or "positioning information" that may be available already but elsewhere.
- Although it may be acceptable that some information is duplicated, e.g. limited amounts of information related to default behaviour of a wireless device, it is desirable to avoid that other information is duplicated, typically more extensive information, such as relating to positioning.

A brief example of a solution, which embodiments herein are based on, for solving or at least reduce problems as above may be to introduce AIT pointers in AITs. For example, an AIT associated with an SSS may instead of access information as such contain only a pointer to another, further, AIT where this information is transmitted. Said other, further AIT may be common for multiple AITs pointing to this AIT. In a network with several different frequencies, i.e. frequency bands, each associated with the transmission of a SSS there may be only a single such "common AIT" transmitted on only one frequency, i.e. one frequency band represented by this frequency. Also, fragments of an AIT associated with an SSS and/or fragments of the further AIT may be provided inside other additional AITs or as separate transmissions associated with other radio resources. As an example some AIT fragments, i.e. partial AIT information, may be provided by another RAT, such as LTE or GSM.

As should be realized, embodiments herein thus enable reducing the total amount of information needed to be transmitted, enable updating of information in only one or at least a fewer number of AITs, enables different stake holders to be in control of and be able to updated only their part of the information, reduce the need of using duplicated information, facilitates use of information from various sources and (re)use of already existing sources of information. Hence, embodiments herein provide improvements with regard to provision of access information enabling a wireless device to access a wireless communication network.

Embodiments herein will now be described in some further detail with support from the drawings.

Figure 2:
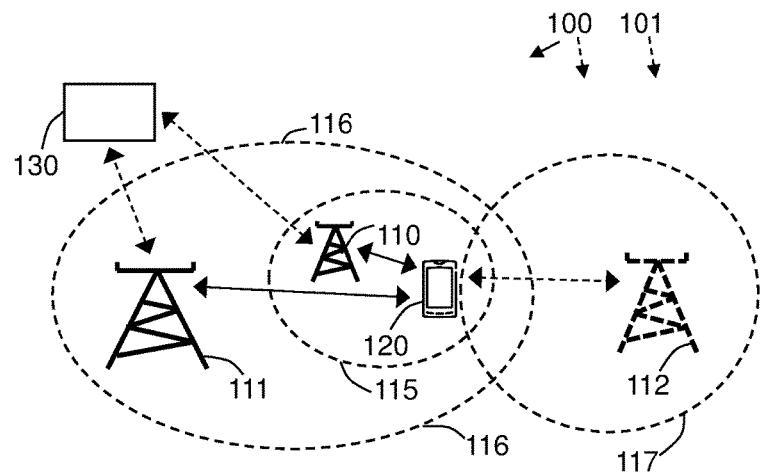
FIG. 2 is a block diagram schematically depicting an example of a wireless communication network in which embodiments herein may be implemented.

FIG. 2 depicts an example of a wireless communication network 100, e.g. a telecommunication network. The wireless communication network 100 comprises a first radio network node 110, e.g. a base station, providing a first radio coverage in a first radio coverage area 115 indicated by a perimeter thereof.

As used herein, "radio network node" as such, may refer to any device configured to be part of a wireless communication network and directly or indirectly be part of providing radio coverage for serving one or more wireless devices in the wireless communication network.

As used herein, "radio coverage area" is an area of radio coverage provided by a radio network node, which radio coverage enable a wireless device to access a wireless communication network that the radio network node is part of, i.e. is comprised in. The radio coverage area is typically associated with:

one or more frequencies, e.g. a frequency range or a frequency band, that may be represented by one, a single frequency, indicating radio frequencies of the radio coverage, an access information compilation, e.g. AIT, enabling the wireless device to access the wireless communication network through the radio network node and an access identifier, e.g. SSS, enabling the wireless device to initially identify that the radio coverage may enable access to wireless communication network and identifying the access identifier table, e.g. so the wireless device can find and access it. Note that this identification of the access identifier may be implicit, for example, it may be known, e.g. predetermined, that when there is an access identifier, e.g. an SSS, on a frequency, there will also be an access information compilation, such as an AIT, present on the same frequency. It may even be known, e.g. predetermined, fully or partly where and/or when the access information compilation will be available, such as in relation to the access identifier. For example, it may be predetermined that the access information compilation, e.g. AIT, when it occurs, will be directly, or within or after a certain time, after occurrence of the access identifier In other words, an access identifier, e.g. a SSS, and an access information compilation, e.g. AIT, are associated with a radio coverage area, e.g. the first radio coverage area 115, and thereby also the radio network node providing the radio coverage, e.g. the first radio network node 110.

The first radio coverage area 115 may thus be associated with a first frequency, a first access identifier, e.g. a first SSS, and a first access information compilation, e.g. a first AIT.

Note that one and the same radio network node may provide more than one and different radio coverage areas, which may be associated with different frequencies and/or different access identifiers, e.g. SSS:s, and access information compilations, e.g. AITs.

Further, in addition to identifying an access information compilation, e.g. AIT, and thereby enabling wireless devices, e.g. the wireless device 120, to access, e.g. find and read, this access information compilation, an access identifier, e.g. SSS, may have a function as a time synchronization reference for wireless devices attempting to access the first wireless communication network through a radio network node. Also, when transmitted the access identifier, e.g. SSS, may serve as a reference for wireless devices regarding transmitted and received power associated with the radio coverage area.

The first wireless communication network 100 further comprises a second radio network node 111, e.g. a base station, providing a second radio coverage in a second radio coverage area 116 indicated by a perimeter thereof. The second radio coverage area 116 may be associated with a second frequency, a second access identifier, e.g. second SSS, and a second access information compilation, e.g. second AIT.

The first and second radio network node 110, 111 may be comprised in a Radio Access Network (RAN) part of the first wireless communication network 100.

A wireless device 120 is shown comprised in the first radio coverage area 115 and the second radio coverage area 116.

The wireless communication network 100 may further comprise one or more further network nodes, such as a further network node 130. The further network node 130 may be a control and/or management network node for controlling or managing the first radio network node and/or the second radio network node 111. The further network node 130 may be a core network node comprised in a core network part of the first wireless communication network 100.

The first wireless communication network 100 may also comprise a third radio network node 112, e.g. a base station, providing a third radio coverage in a third radio coverage area 117 indicated by a perimeter thereof.

Alternatively the third radio network node 112 and the third radio coverage area 117 are comprised in, i.e. part of, a second wireless communication network 101, e.g. a telecommunication network. The second wireless communication network 101 may differ in that it is operated by another operator than the first wireless communication network 100 and/or is a wireless communication network according to another Radio Access Technology (RAT) than the first wireless communication network 100. For example, the first wireless communication network 100 may be a 5G network and the second wireless communication network 101 may be a conventional network, e.g. according to LTE, UMTS or GSM.

The third radio coverage area 117 may be associated with a third frequency, a third access identifier, e.g. third SSS, and a third access information compilation, e.g. third AIT.

Note that how the radio coverage areas in FIG. 2 have been drawn in relation to each other is just an example. For example, the second radio coverage area 116 may instead be fully comprised in the first radio coverage area 115. In general the radio coverage areas may overlap more or less and differently than shown in the figure.

Attention is also drawn to that FIG. 2 is only schematic and for exemplifying purpose and that not everything shown in the figure may be required for all embodiments herein, as will be evident to the skilled person. Also, a wireless communication network or networks that in reality correspond(s) to the first wireless communication network 100 and/or the second wireless communication network 101 will typically comprise several further network nodes, base stations, radio coverage areas etc., as realized by the skilled person, but which are not shown herein for the sake of simplifying.

Figure 3:
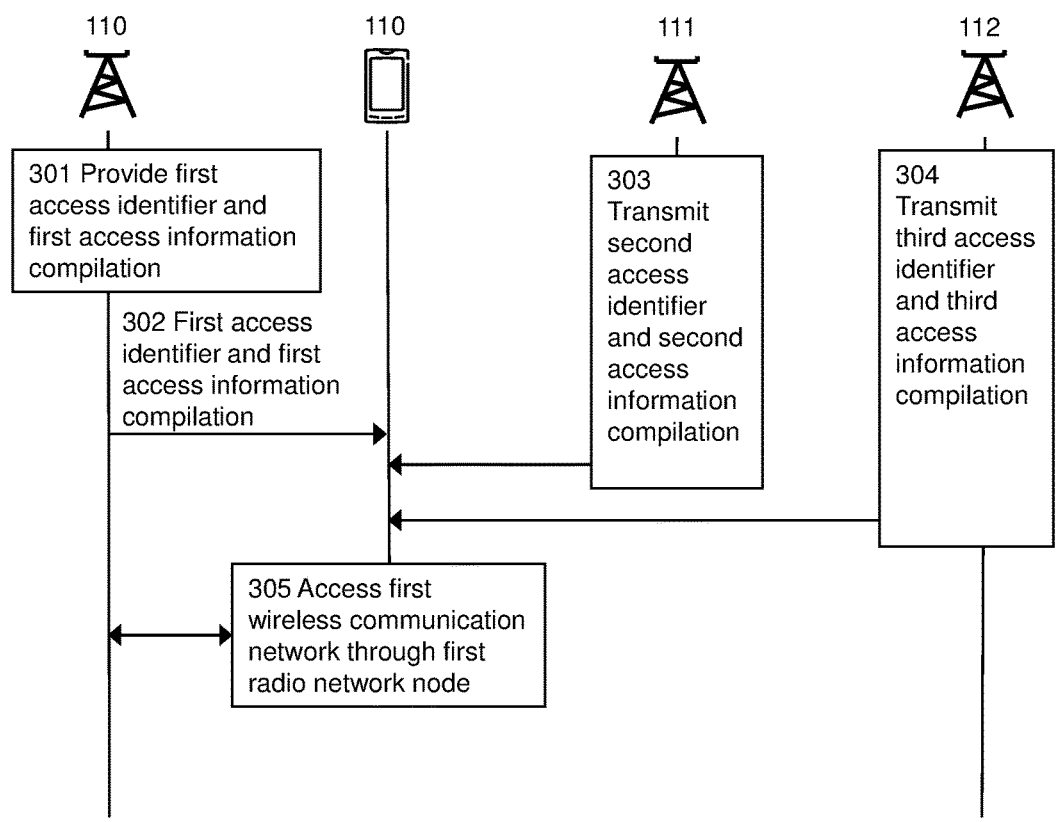
FIG. 3 is a combined signaling diagram and flowchart for describing embodiments herein.

FIG. 3 depicts a combined signaling diagram and flowchart and will be used to discuss examples of embodiments of a method, and related examples, for managing access information enabling the wireless device 120 to access the first wireless communication network 100 through the first radio network node 110.

Action 301

The first radio network node 110 provides the first access identifier and the first access information compilation as were mentioned above in connection with FIG. 2, e.g. a first SSS and a first AIT. Hence, the first access identifier identifies the first access information compilation and the first access information compilation identifies access information that enables the wireless device 120 to access the first wireless communication network 100 through the first radio network node 110. However, here, in contrast to e.g. the prior art AITs mentioned in the Background, the first access information compilation identifies where to receive another, further access information compilation, i.e. directs or points to this further access information compilation. The further access information compilation comprises at least part of said access information, i.e. as identified by the first access information compilation. In other words, the first access information compilation identifies said access information fully or partly by pointing to the further access information compilation, i.e. to another access information compilation, that identifies, e.g. comprises, at least part of said access information. The further access information compilation is associated with a transmission, e.g. broadcast, typically by being transmitted or being configured to be transmitted, on a different frequency, i.e. a different frequency band, and/or at a different time, i.e. during e.g. a different time period, time range or time slot, than the first access information compilation.

As already indicated above, the first access identifier, in addition to identifying the first access information compilation, may function as a time synchronization reference for wireless devices, e.g. the wireless device 120, attempting to access the first wireless communication network 100 through the first radio network node 110.

The further access information compilation may additionally comprise at least part of other access information. The other access information enabling the wireless device 120 to access the first wireless communication network 100 and/or another wireless communication network, e.g. the second wireless communication network 101, through one or more other frequencies and/or radio network nodes, e.g. the second radio network node 111 and/or the third radio network node 112. That is, the further access information compilation may in this case be regarded to be a common access information compilation providing access information associated with multiple frequencies and/or radio network nodes, and may be commonly used by multiple access information compilations pointing to it.

As used herein, common access information compilation, e.g. common AIT, may thus refer to an access information compilation that comprises information that is common for multiple frequencies and/or radio network nodes and e.g. is being identified, i.e. is being pointed to, by at least some of said multiple access information compilations, e.g. the first access information compilation, the second access information compilation and/or the third access information compilation.

The first access information compilation may identify where to receive the further access information table by comprising information on:
 which frequency the further access information compilation is being transmitted, e.g. broadcasted, on, and/or
 a time when the further access information compilation will be transmitted, e.g broadcasted.

The first access information compilation may further identify information facilitating accessing the further access information compilation. The information facilitating accessing the further access information compilation may e.g. facilitate making a faster access, e.g. by reducing the need for testing various access options to find one that works. This may e.g. reduce the need for blind decoding attempts, e.g. on a frequency where the further access information compilation is transmitted, e.g. broadcasted. Said information facilitating accessing the further access information compilation may comprise one or more parameters relating to one or more of the following:
 a coding scheme used for the transmission of the further access information compilation,
 a demodulation reference signal for use in demodulating a signal comprising the further access information compilation,
 a time synchronization reference signal for use in accessing the further access information compilation,
 a RAT associated with provision of the further access information compilation.

Note that the present action may alternatively be performed by the further network node 130, which in the present action then would additionally send the provided first access information compilation and first access identifier to the first radio network node 110 so that the first radio network node 110 e.g. can perform action 302 and 305 below.

Action 302

The first radio network node 110 may transmit, e.g. broadcast, on the first frequency, the first access identifier and the first access information compilation. That is, the first access identifier and the first access information compilation become available, e.g. through broadcast, in the first radio coverage area 115. The wireless device may receive the transmitted first access identifier and first access information compilation.

In some embodiments, the first access information compilation and the further access information compilation are periodically broadcasted, the further access information compilation with a longer periodicity. This enables to avoid frequent transmission, e.g. broadcasting, of larger amount of information as may be the case for the further access information compilation, but at the same time initial search for radio coverage, corresponding to an initial cell search, can be performed and be based on some information directly in the first access information compilation that occurs more often. That is, this enables an initial radio coverage search, corresponding to a cell search, without having to receive the further access information compilation first. Switching from one radio coverage area to another, i.e. corresponding to a cell switch or handover, may then be performed faster when the further access information compilation has been received, compared to if the further access information compilation would contain all information and therefore would always have to be waiting before it would be possible to continue. If this is combined with embodiments mentioned above, where the first access information compilation identifies how to access the further access information compilation by identifying a parameter relating to a time when the further access information compilation will be transmitted, the wireless device 120 does not have to be awake all the time when waiting for the further access information compilation and thus it is e.g. enabled reduction of battery consumption of the wireless device 120.

Action 303

Correspondingly as in Action 302, the second radio network node 111 may transmit, e.g. broadcast, on the second frequency, the second access identifier and the second access information compilation. That is, the second access identifier and the second access information compilation become available, e.g. through broadcast, in the second radio coverage area 116.

The second access information compilation may be separate from said further access information compilation but in some embodiments the second access information compilation is said further access information compilation. The wireless device 120 may then, based on the in Action 302 received first access information compilation, receive the, in the present action, transmitted further, i.e. second, access information compilation.

Action 304

Correspondingly as in Action 302 and Action 303, the third radio network node 112 may transmit, e.g. broadcast, on the third frequency, the third access identifier and the third access information compilation. That is, the third access identifier and the third access information compilation become available, e.g. through broadcast, in the third radio coverage area 117.

Action 305

The wireless device 120 may access, based on the further access information compilation, e.g received in Action 303, the first wireless communication network 100 through the first radio network node 110.

Embodiments described above involving that the first access information compilation, e.g. first AIT, identifies how to access the further access information compilation, e.g. further AIT, for provision of access information enabling the wireless device 120 to access a wireless communication network 100 are further described and explained below, mainly in connection with FIG. 4.

In some embodiments, the first access information compilation and/or the further access information compilation identifies one or more additional access information compilations, e.g. the second access information compilation and/or the third access information compilation. The one or more additional access information compilations may be for transmission, e.g. broadcast, or are transmitted, e.g. broadcasted, on different frequencies and/or at different times than the first access information compilation and/or the further access information compilation. In other words, the first access information compilation and/or the further access information compilation may point to yet another, additional access information compilation. These embodiments are mainly described and explained below in connection with FIGS. 5-8.

In some, currently unclaimed, embodiments, the first access information compilation identifies said one or more additional access information compilations without identifying the further access information compilation. In these embodiments the method described above in connection with FIG. 3 and performed by the first radio network node 110 and/or the first network node 130, need not be for managing, e.g. providing and/or obtaining, access information enabling the wireless device 120 to access the first wireless communication network 100 through the first radio network node 110. Instead the method may be for providing system information, or information in general, in the first access information compilation to the wireless device 120. System information in this context may refer to system information in general and e.g. any information that is not frequency and/or network node specific or not even specific for the first wireless communication network or any other wireless communication network. That is, the system information may be information that is common for multiple frequencies and/or multiple network nodes comprised in the first wireless communication network 100 or any other wireless communication network, or even common between wireless communication networks. Positioning information is an example of the latter and operator specific information is an example that may be valid for both the former and latter cases.

In any case, embodiments herein involve that the first access information compilation, e.g. first AIT, identifies how to access, i.e. points to, the further access information compilation, e.g. a further and possibly common AIT, that comprises at least part of the access information identified by the first access information compilation. This enables a flexible framework for providing information, e.g. access information and other system related information, to wireless devices, and for the wireless devices to obtain the same information. Improvements and advantages thanks to embodiments herein e.g. include:

reduction of the need for different AITs with virtually the same information, facilitated update and change of AIT information and making sure that AIT information is consistent within the involved wireless communication network(s), enabling to broadcast different AIT information to different wireless devices, reduction of the amount of information needed to be broadcasted on different frequencies at virtually the same time and thus enabling reduction of interference in the network, enabling better control and flexibility of what information is broadcasted and e.g is duplicated or not, enabling provision of improved decision making information to wireless devices, e.g. about several cells provided by multiple radio network nodes, before attempting to access a wireless communication network through any of these radio network nodes.

As already mentioned above, various embodiments herein and types are further described and explained below in connection with FIGS. 4-8.

Figure 4:
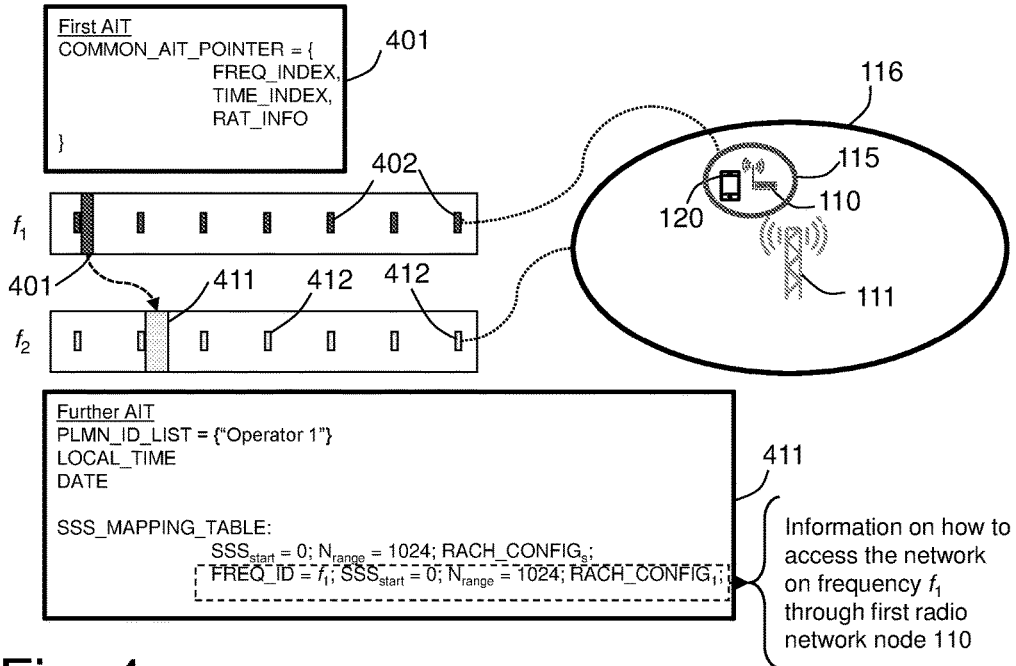
FIG. 4 is a combined view schematically illustrating a first type of embodiments.

FIG. 4 is a combined view schematically illustrating a first type of embodiments. As illustrated in the figure, in the first radio coverage area 115, the first radio network node 110 transmits, e.g. broadcasts, a first AIT 401 corresponding to and exemplifying the first access information compilation and a first SSS 402 corresponding to and exemplifying the first access identifier. The first AIT 401 and first SSS 402 are transmitted, e.g. broadcasted, on a frequency f1 exemplifying the first frequency.

Further, the second radio network node 111 transmits, e.g. broadcasts, a second AIT 411 corresponding to and exemplifying the second access information compilation and a second SSS 412 corresponding to and exemplifying the second access identifier.

In the first type of embodiments, the second access information compilation is the further access information compilation, as discussed above in connection with FIG. 3, i.e. the second AIT 411 is a further, and possibly common, AIT as it is also named in the figure. The second, further, AIT 411 and second SSS 412 are transmitted, e.g. broadcasted, on a frequency f2 exemplifying the second frequency.

The first AIT 401 may alternatively be named "minimum AIT" referring to that it in principle may comprise a minimum of information, such as only a pointer to the second, common, AIT 411. Other suitable names of this kind of AIT may be "pointer AIT" or even "dummy AIT". The first AIT 401 thus point the wireless device 120 to a radio resource, here via the second, further, AIT 411, identified by e.g. one or more of the following; frequency, time, code, demodulation reference signal, time synchronization reference signal, RAT.

It should be noted that what is shown in the figure is only an example, the first AIT 401 could as well point to also additional AITs and/or also directly contain some information without using a pointer to another AIT.

The wireless device may search for SSS transmissions and find the first SSS 402 transmitted on frequency f1 and the second SSS 411 on frequency f2. Assuming that the wireless device 120 decides to access the first AIT 401 associated with the first SSS 402 on f1 first, it will at a first point in time decode the first AIT 401 on frequency f1 and by that be informed that the second, further, AIT 411, in this case comprising the actual information, is transmitted on frequency f2, e.g. disclosed by FREQ_INDEX in the figure, will be available at a second point in time, e.g. disclosed by TIME_INDEX in the figure. The wireless device 120 then proceeds with accessing and decoding the second, further AIT 411 that was pointed out. In the second, further, AIT 411 the wireless device 120 find information on how to access the first radio network node 110 transmitting the first SSS 402 on frequency f1. In this and other examples herein, PLMN_ID is an operator identity and PLMN_ID_LIST List in an AIT may be a list of one or more PLMN identities for which the AIT is valid and shall preferably match subscription information of the wireless device 120. Also, RACH_CONFIG comprise parameters defining RACH, e.g. pre-amble sequence, power control, back-off etc. There may and are typically also other information in the AITs, e.g. the second, further, AIT 411, than shown here, e.g. information on how access the wireless communication network 100 through further radio network nodes, e.g. the second radio network node 111 transmitting, e.g. broadcasting, the second SSS 412 on frequency f2.

As indicated in the figure by the size of the first and second radio coverage areas 115, 116, the first and second radio network nodes 110, 111 transmitting, e.g. broadcasting, the first and second SSS 402, 412 may have very different transmission power. The actual decision whether the wireless device 120 shall connect to the higher power, second radio network node on frequency f2 or the lower power, first radio network node 110 on frequency f1 may depend on both the received power as well as knowledge of the transmitted power of the first and second SSS 402, 412. By use of the pointer to the second, further, AIT 411, e.g. disclosed by the COMMON_AIT_POINTER in the figure, it can be made sure that any wireless device 120 accessing the lower power, first radio network node 110 on frequency f1 also will be aware of higher power, second radio network node 111 on frequency f2, and vice versa. This enables wireless devices to have access to information for making a proper and suitable selection and decision regarding which radio network node to use for accessing the first wireless communication system 100.

As can be seen in the figure, the first AIT 401 and the second, further, AIT 411 may be periodically transmitted, e.g. broadcasted, the second, further, AIT 411 with a substantially longer periodicity, as already has been discussed above under Action 302 and is also further exemplified below.

The second, further, AIT 411 is preferably transmitted slightly after the first AIT 401 and any other AIT(s) pointing to it. This in order to keep down the time waiting for the second, further, AIT 411 after the first AIT 401 has been received by the wireless device 120 and the wireless device e.g. has decoded a pointer to the second, further, AIT 411, e.g. the COMMON_AIT_POINTER shown in the figure, and thereby knows where and how to receive the second, further, AIT 411. In general it may be advantageous to transmit the first AIT 401 based on information when the second, further, AIT 411 is transmitted, e.g. broadcasted, or vice versa. This enables, and may be used to ensure, that unnecessary waiting for the second, further, AIT 411 is avoided by the wireless device 120 and thus e.g. reduce battery consumption. It is desirable that waiting for a broadcast of the second, further, AIT 411 that the first AIT 401 points to, is short and that the second, further, AIT 411 can be received as soon as possible after the first AIT 401 has been received. Preferably the first AIT 401 is transmitted and then there may be a, as small as possible but suitable, time gap for allowing the first AIT 401 to be properly received and taken care of by all potentially relevant wireless devices, including the wireless device 120, before the second, further, AIT 411 is transmitted, e.g. broadcasted.

Information on when any of the AITs, e.g. the first AIT 401 and the second, further, AIT 411, is transmitted, e.g. broadcasted, may be predefined and/or predetermined. Transmission. e.g. broadcast, of one of these AITs may be triggered by when the other AIT has been or will be transmitted, e.g. broadcasted. The AITs may e.g. be transmitted, e.g. broadcasted, with synchronized periodicities that are offset in relation to each other, which periodicities are the same or one is an integer multiple of the other. The offset should at least be such that the second, further, AIT 411 occurs closer after than before broadcast of the first AIT 401, but preferably so that the waiting is as small as possible as discussed above.

In the shown example, the second, further, AIT 411 and the first AIT 401 are associated with transmission on different frequencies. However, in some embodiments the first AIT 401 and the second, further, AIT 411 are instead associated with transmission, e.g. broadcast, on the same frequency. Even if on the same frequency it may be more efficient to transmit the second, further, AIT 411 as a separate table but on a frequency also used for transmitting another AIT, e.g. the first AIT 401. This is further exemplified below.

Hence, in some embodiments, not shown in FIG. 4, the frequencies f1 and f2 are equal, i.e. the first AIT 401 and the second, further, AIT 411 being transmitted on the same frequency. In such case the first radio network node 110 may transmit a pointer, e.g. in the first AIT 401, to when in time the second radio network node 111 operating on the same frequency will transmit the second, further, AIT 411.

In some embodiments, also not shown in FIG. 4, the first AIT 401 and second, further, AIT 411 are transmitted by the same radio network node on the same frequency, i.e. also here the first AIT 401 points to the same frequency as the second, further, AIT 411 and second SSS 412 are transmitted on. In case the second, further, AIT 411 is relatively large and transmitted seldom, introducing a number of additional smaller AITs, broadcasted on the same frequency by the same radio network node, can help the wireless device 120 when performing an initial search in a radio coverage area, corresponding to an initial cell search. If the second, further AIT, 411 is transmitted e.g. every 10.24 seconds, introducing such smaller AIT every 100-1000 ms, which smaller AIT informs the wireless device 120 about when the second, further, AIT 411 will be transmitted, will enable reducing battery consumption of the wireless device 120 and speed up initial cell search.

Figure 5:
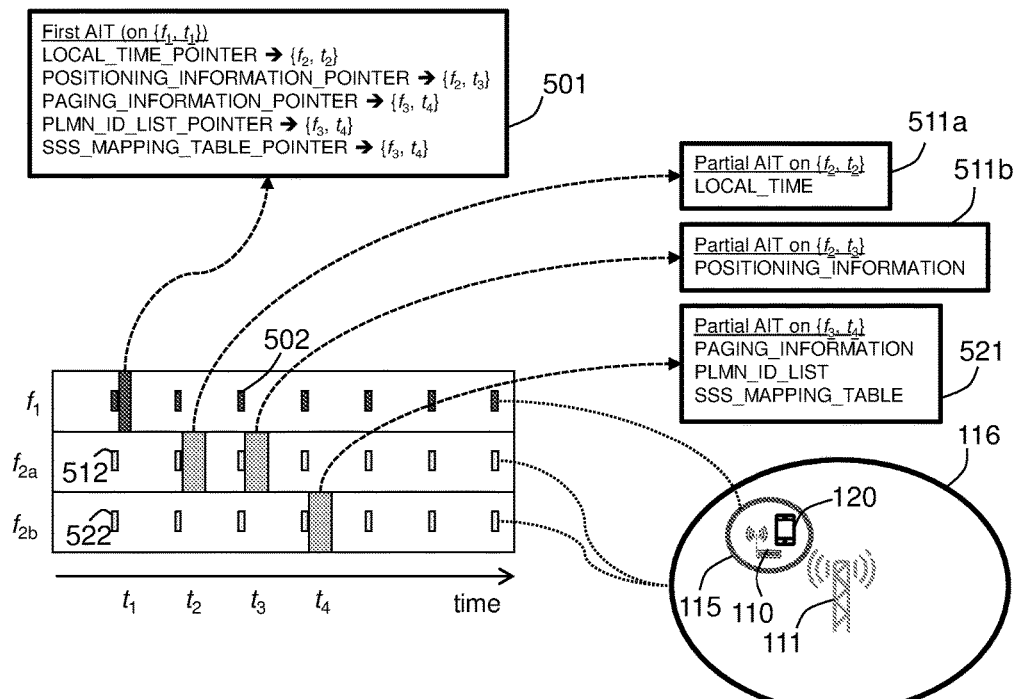
FIG. 5 is a combined view schematically illustrating a second type of embodiments.

FIG. 5 is a combined view schematically illustrating a second type of embodiments. The second type of embodiments is of the kind mentioned above in the text following the text discussing FIG. 3, where the first access information compilation and/or the further access information compilation identifies, i.e. points to, one or more additional access information compilations. In particular, the second type of embodiments relates to when the one or more additional access information compilations comprise partial information of the first access information compilation and/or the further access information compilation. Or in other words, when the one or more additional access information compilations comprise partial information of the access information compilation(s) pointing to the one or more additional access information compilations. Such one or more additional access information compilations are named partial access information compilations in the following. Shown in the figure is an example when partial information of the first access information compilation is comprised in said one or more additional access information compilations.

In the shown example, the first radio network node 110 transmits, e.g. broadcasts, in the first radio coverage area 115, a first AIT 501 corresponding to and exemplifying the first access information compilation. The first radio network node 110 also broadcasts a first SSS 502 associated with the first AIT 501 and exemplifying the first access identifier. The first AIT 501 and the first SSS 502 are transmitted, e.g. broadcasted, on the frequency f1 exemplifying the first frequency.

Further, in the shown example, the second radio network node 111 transmits, e.g. broadcasts, in the second radio coverage are 116, a first partial AIT 511a, a second partial AIT 511b and a third partial AIT 521, corresponding to and exemplifying said partial access information compilations, each of them also exemplifies the second access information compilation. In the shown example, the first partial AIT 511a comprises information about local time, the second partial AIT 511b comprises positioning information and the third partial AIT 521 comprises paging information. The second radio network node 111 also broadcasts a second SSS 512 associated with the first partial AIT 511a and the second partial AIT 511b, and a third SSS 522 associated with the third partial AIT 521. The second SSS 512 and the third SSS 522 each exemplifies the second access identifier. The first partial AIT 511a, the second partial AIT 511b and the second SSS 512 are broadcasted on a frequency f2a exemplifying the second frequency. The third partial AIT 521 and the third SSS 522 are broadcasted on a frequency f2b also exemplifying the second frequency.

Hence, as illustrated in the figure, the first AIT 501 identifies, i.e. points to, the partial AITs, each with regard to part of the information that is being identified by the first AIT 501.

As also illustrated in FIG. 5, some part(s) of the information in an AIT may be provided on another frequency. Common transmission of certain information in a partial AIT may be related to e.g. time information, positioning information, paging information, PLMN information, SSS-to-access information mapping, etc.

The second type of embodiments may be of particular interest in a multi-RAT scenario where e.g. a certain functionality, such as time provisioning, is already provided by a legacy RAT. Different partial AITs may be transmitted with different periodicity.

Figure 6:
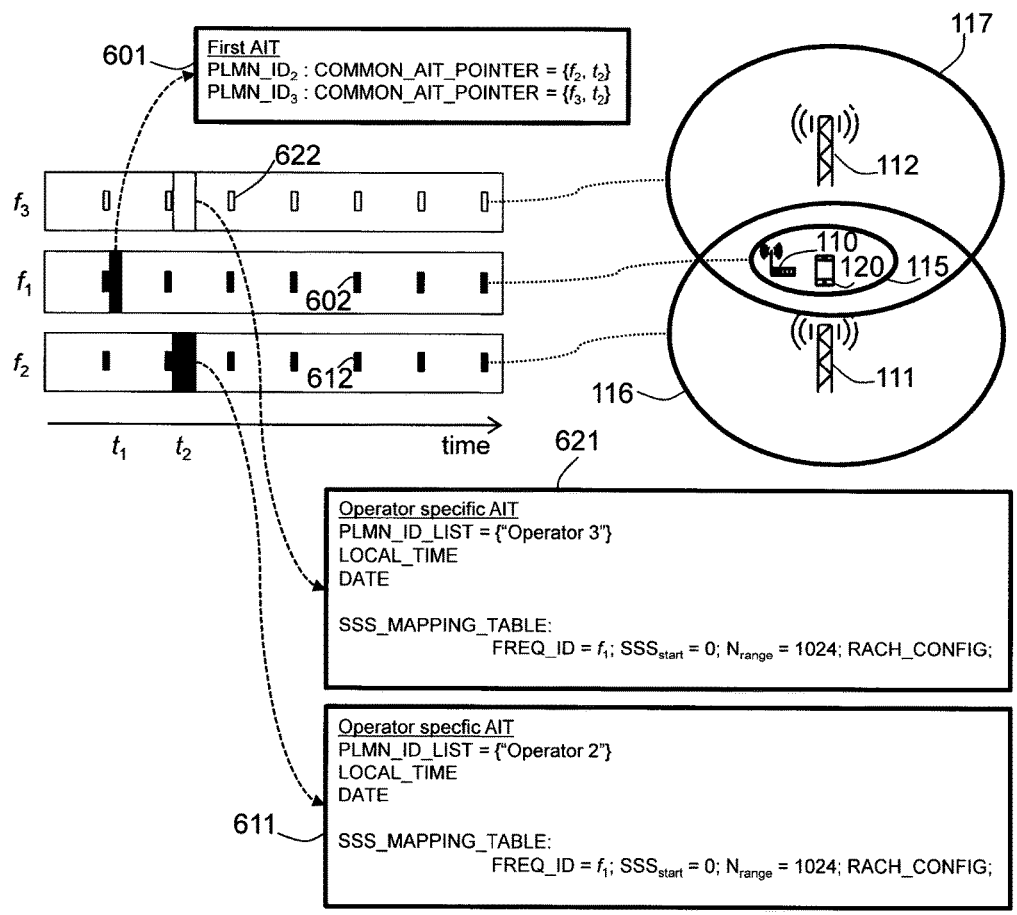
FIG. 6 is a combined view schematically illustrating a third type of embodiments.

FIG. 6 is a combined view schematically illustrating a third type of embodiments. The third type of embodiments is also of the kind mentioned above in the text following the text discussing FIG. 3, where the first access information compilation and/or the further access information compilation identifies one or more additional access information compilations. The figure shows an example when the first access information compilation identifies the one or more additional access information compilations. In particular, the third type of embodiments relates to when the additional one or more access information compilations are specific for one or more operators associated with the first wireless communication network 100 and/or the second wireless communication network 101.

As illustrated in the figure, the first radio network node 110 transmits, e.g. broadcasts, in the first radio coverage area 115, a first AIT 601 corresponding to and exemplifying the first access information compilation. The first radio network node 110 also broadcasts a first SSS 602 associated with the first AIT 601 and exemplifying the first access identifier. The first AIT 601 and the first SSS 602 are transmitted, e.g. broadcasted, on the frequency f1 exemplifying the first frequency.

Further, in the shown example, the second radio network node 111 transmits, e.g. broadcasts, in the second radio coverage area 116, a first operator specific AIT 611 corresponding to and exemplifying one of said one or more additional access information compilations and also the second access information compilation. In the shown example, the first operator specific AIT 611 comprises virtually the same type of information as the second, further, AIT 411 in the first type of embodiments discussed above in connection with FIG. 4, but only for one and the same operator, "Operator 2" according to the figure. The second radio network node 111 also broadcasts a second SSS 612 associated with the first operator specific AIT 611. The second SSS 612 exemplifies the second access identifier. The first operator specific AIT 611 and the second SSS 612 are broadcasted on the frequency f2 exemplifying the second frequency.

Moreover, in the shown example, the third radio network node 112 transmits, e.g. broadcasts, in the third radio coverage area 117, a second operator specific AIT 621 corresponding to and exemplifying another one of said one or more additional access information compilations, it also exemplifies the third access information compilation. In the shown example, also the second operator specific AIT 621 comprises virtually the same type of information as the second, further, AIT 411 in the first type of embodiments discussed above in connection with FIG. 4, but for one and the same operator, in this case "Operator 1" according to the figure. Hence the first and second operator specific AITs 611, 621 comprises the same type of information but for different operators. An advantage of separating information into separate operator specific AITs is e.g. that each operator then can have access to and update, change etc. information separate from other operators in the same network or in another network. The second radio network node 111 also broadcasts a third SSS 622 associated with the second operator specific AIT 621. The third SSS 622 exemplifies the third access identifier. The second operator specific AIT 621 and the third SSS 622 are broadcasted on a frequency f3 exemplifying the third frequency.

The figure illustrates multi-stakeholder scenario where an AIT, here the first AIT 601, may contain pointers relevant only for wireless devices associated with a particular operator. The first radio network node 110 may be a third party network node and the first AIT 601 may contain information that relates to wireless devices according to their operator affiliation. For example, in case the wireless device 120 has a Subscriber Identity Module (SIM) card associated with e.g. "Operator 2" it will find information in the first AIT 601 that at a relevant AIT will be transmitted on frequency f2 at a time t2, i.e. the first AIT 601 points to the first operator specific AIT 611 for the information. The second operator specific AIT 621 on frequency band f1 may have another PLMN_ID in a header than the first operator specific AIT 611, but still inform wireless devices associated with different operators about where they may find information on how to access the third radio network node 112. Further, since the wireless device 120 for these embodiments will use its own operator to gain information about how to access a certain third party node, the operator can ensure that proper network selection rules are enforced before the wireless device 120 accesses a node outside of what the operator control.

Figure 7:
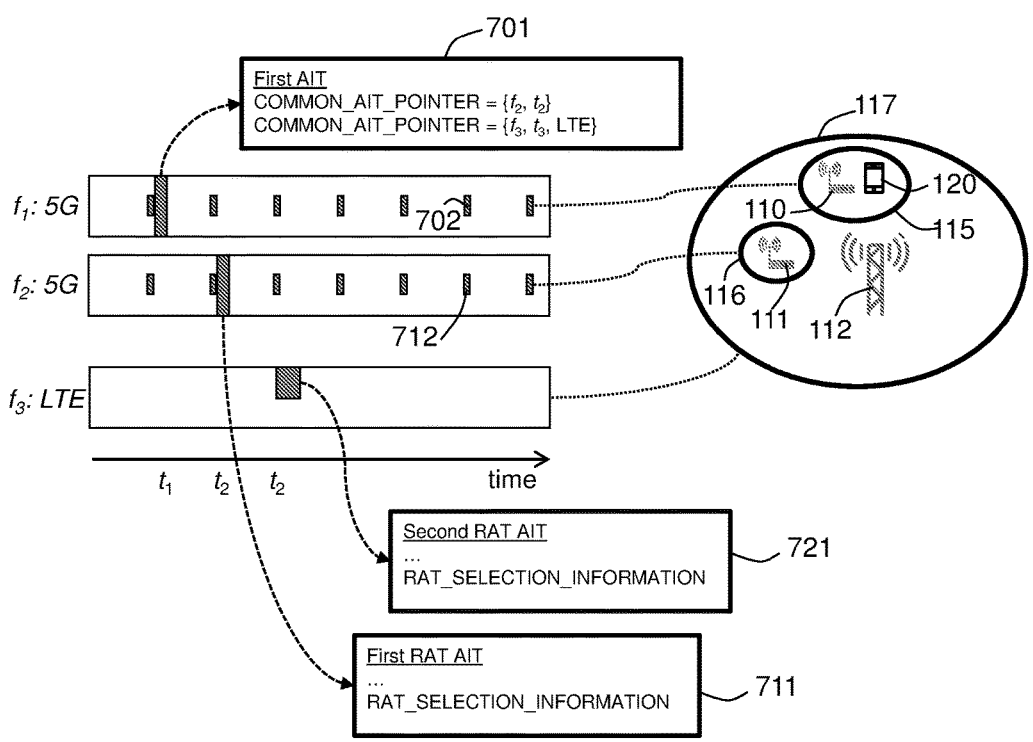
FIG. 7 is a combined view schematically illustrating a fourth type of embodiments.

FIG. 7 is a combined view schematically illustrating a fourth type of embodiments. The fourth type of embodiments is also of the kind mentioned above in the text following the text discussing FIG. 3, where the first access information compilation and/or the further access information compilation identifies one or more additional access information compilations. The figure shows an example when the first access information compilation identifies the one or more additional access information compilations. In particular, the fourth type of embodiments e.g. relates to when at least some of said one or more additional access information compilations are associated with another RAT than the first wireless communication network 100. They also relate to when the first access information compilation and/or the further access information compilation, by means of at least some of said one or more additional access information compilations, are associated with one or more further wireless communication networks, e.g. the second wireless communication network 101, and/or further radio network nodes, e.g. the second radio network node 111 and/or the third radio network node 112. Thereby the wireless device 120 is e.g. enabled to evaluate alternatives before accessing the first wireless communication network 100 through the first radio network node 110.

As illustrated in the figure, the first radio network node 110 transmits, e.g. broadcasts, in the first radio coverage area 115, a first AIT 701 corresponding to and exemplifying the first access information compilation. The first radio network node 110 also transmits, e.g. broadcasts, a first SSS 702 associated with the first AIT 701 and exemplifying the first access identifier. The first AIT 701 and the first SSS 702 are transmitted, e.g. broadcasted, on the frequency f1 exemplifying the first frequency.

Further, in the shown example, the second radio network node 111 transmits, e.g. broadcasts, in the second radio coverage area 116, a first RAT AIT 711 corresponding to and exemplifying one of said one or more additional access information compilations, it also exemplifies the second access information compilation. The first RAT AIT 711 may comprise virtually the same type of information as the second, further, AIT 411 in the first type of embodiments discussed above in connection with FIG. 4. The second radio network node 111 also transmits, e.g. broadcasts, a second SSS 712 associated with the first RAT AIT 711. The second SSS 712 exemplifies the second access identifier. The first RAT AIT 711 and the second SSS 712 are transmitted, e.g. broadcasted, on a frequency f2 exemplifying the second frequency.

In the show example, the first and second radio network nodes 111, 112 operate and provide radio coverage on frequencies f1, f2 according to a first RAT, e.g. 5G.

Moreover, in the shown example, the third radio network node 112 transmits, e.g. broadcasts, in the third radio coverage area 117, a second RAT AIT 721 corresponding to and exemplifying another one of said one or more additional access information compilations, it also exemplifies the third access information compilation. The third radio network node 112 operates and provides radio coverage on frequency f3 according to a second RAT, e.g. LTE.

Also the second RAT AIT 721 may comprise virtually the same type of information as the second, further, AIT in the first type of embodiments discussed above in connection with FIG. 4. In any case, the second RAT AIT 721 is an example of that the first AIT 701 may identify, i.e. point to, an AIT in another RAT, e.g. LTE, and thus information may be gathered also from other RATs. This may e.g. be advantageous in order to be better informed about options before making a decision, e.g. a handover decision, and/or when certain information is only or already available in another RAT. Thanks to the fourth type of embodiments, such "other RAT" information can be made available to the first wireless communication network 100 and wireless devices, e.g. the wireless device 120, served therein. In LTE, an access information compilation, e,g, an AIT or similar, such as the second RAT AIT 721, may be provided in several different ways e.g. in Multicast/Broadcast Single Frequency Network (MBSFN) sub-frames, as an Multimedia Broadcast Multicast Service (MBMS), or as a new System Information Block (SIB), just to mention some examples. The fourth type of embodiments may thus involve multiple AIT pointers for the purpose of enforcing the wireless device 120 to check several frequencies and several RATs prior to making an initial access. Note that depending on the capability of the wireless device 120, e.g. which RATs it supports, it may not always be able to detect networks and RAT AITs associated with some RATs.

Figure 8:
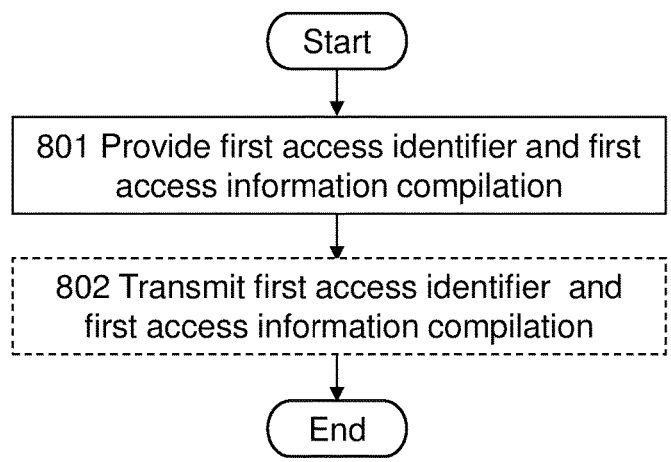
FIG. 8 is a flowchart schematically illustrating embodiments of a method performed in a first network node.

FIG. 8 is a flow chart schematically illustrating embodiments of a method, performed by a first network node, e.g. the first radio network node 110 or the further network node 130, for providing access information enabling a wireless device, e.g. the wireless device 120, to access a first wireless communication network, e.g. the first wireless communication network 100, through a first radio network node, e.g. the first radio network node 100 comprised in the first wireless communication network 100.

For the sake of simplifying, the method is described in the following with the first radio network node 110 exemplifying the first network node that performs the method. However, as indicated above, the actions below, where applicable, could as well be performed by e.g. the further network node 130.

The method comprises the following actions, which actions may be taken in any suitable order and/or be carried out fully or partly overlapping in time when this is possible and suitable.

Action 801

The first radio network node 110 provides a first access identifier and a first access information compilation, e.g. as exemplified above. The first access identifier identifies the first access information compilation. The first access information compilation identifies access information that enables the wireless device 120 to access the first wireless communication network 100 through the first radio network node 110, Moreover, the first access information compilation identifies where to receive another, further access information compilation, e.g. as exemplified above, that comprises at least part of said access information and is associated with a transmission on a different frequency and/or at a different time than the first access information compilation.

In some embodiments, the first access identifier, in addition to identifying the first access information compilation, functions as a time synchronization reference for wireless devices, e.g. the wireless device 120, attempting to access the first wireless communication network 100 through the first radio network node 110.

The first access information compilation may identify where to receive the further access information compilation by comprising information on:

which frequency the further access information compilation is being transmitted on, and/or a time when the further access information compilation is being transmitted.

Moreover, the first access information compilation may further identify information facilitating accessing the further access information compilation. This information may comprise one or more parameters relating to one or more of the following:

a coding scheme used for the transmission of the further access information compilation, a demodulation reference signal for use in demodulating a signal comprising the further access information compilation, a time synchronization reference signal for use in accessing the further access information compilation, a RAT associated with provision of the further access information compilation.

In some embodiments, the further access information compilation additionally comprises at least part of other access information. The other access information enabling the wireless device 120 to access the first wireless communication network 100 and/or another, second wireless communication network 101, through one or more other frequencies and/or radio network nodes, e.g. the second and/or third radio network nodes 111, 112. The further access information compilation thus provides access information associated with multiple frequencies and/or radio network nodes.

In some embodiments, said further access information compilation is transmitted on the same frequency as an access information compilation identifying how to access the further access information compilation.

Further, in some embodiments, said first access information compilation and the further access information compilation are periodically transmitted, the further access information compilation with a substantially longer periodicity.

Moreover, in some embodiments, the first access information compilation is transmitted based on information when the further access information compilation is transmitted, or the further access information compilation is transmitted based on information when the first access information compilation is transmitted.

Furthermore, in some embodiments, the first access information compilation and/or the further access information compilation may identify one or more additional access information compilations.

Said one or more additional access information compilations may comprise partial information of the first access information compilation and/or the further access information compilation.

At least some of said one or more additional access information compilations may be specific for one or more operators of the first wireless communication network 100 and/or the second wireless communication network 101.

At least some of said one or more additional access information compilations may be associated with another RAT than the first wireless communication network 100.

The first access information compilation and/or the further access information compilation may, by means of at least some of said one or more additional access information compilations, be associated with one or more further wireless communication networks, e.g. the second wireless communication network 101 and/or further radio network nodes, e.g. the second and/or third radio network nodes 111, 112. The wireless device 120 is thereby enabled to evaluate alternatives before accessing the first wireless communication network 100 through the first radio network node 110.

This action may fully or partly correspond to Action 301 above.

Action 802

The first radio network node 110 may transmit, on a first frequency, the first access identifier and the first access information compilation.

This action may fully or partly correspond to Action 302 above.

Figure 9:
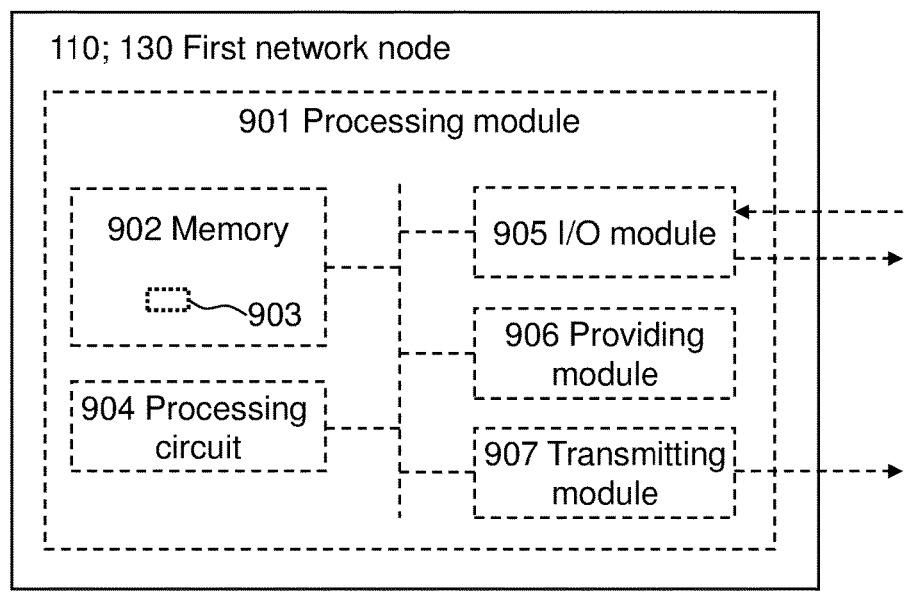
FIG. 9 is a functional block diagram for illustrating embodiments of the first network node.

FIG. 9 is a schematic block diagram for illustrating embodiments of the first network node, e.g. the first radio network node 110 or the further network node 130, for providing access information enabling the wireless device 120 to access the first wireless communication network 100 through the first radio network node 110. The figure is particularly for illustrating how the wireless device 120 may be configured to perform the method and actions discussed above in connection with FIG. 8. The first radio network node 110 will be used to exemplify the first network node in the following, but may where suitable be replaced by the further network node 130 that is also an example of the first network node.

The first radio network node 110 may comprise a processing module 901, such as a means, one or more hardware modules, including e.g. one or more processors, and/or one or more software modules for performing said methods and/or actions.

The first radio network node 110 may further comprise a memory 902 that may comprise, such as contain or store, a computer program 903. The computer program comprises 'instructions' or 'code' directly or indirectly executable by the first radio network node 110 so that it performs said methods and/or actions. The memory 902 may comprise one or more memory units and may be further be arranged to store data, such as configurations and/or applications involved in or for performing functions and actions of embodiments herein.

Moreover, the first radio network node 110 may comprise a processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the first radio network node 110 is operative, or configured, to perform said method and/or actions.

Typically the first radio network node 110, e.g. the processing module 901, comprises an Input/Output (I/O) module 905, configured to be involved in, e.g. by performing, any communication to and/or from other units and/or nodes, such as sending and/or receiving information to and/or from other external nodes or devices. The I/O module 905 may be exemplified by an obtaining, e.g. receiving, module and/or a providing, e.g. sending, module, when applicable.

In further embodiments, the first radio network node 110, e.g. the processing module 901, may comprise one or more of an providing module 906 and a transmitting module 907 as exemplifying hardware and/or software module(s). In some embodiments, the providing module 906 and the transmitting module 907 may be fully or partly implemented by the processing circuit 904.

Therefore, according to the various embodiments described above, the first radio network node 110, and/or the processing module 901 and/or the providing module 906 are operative, or configured, to, provide said first access identifier and said first access information compilation.

Moreover, according to the various embodiments described above, the first radio network node 110, and/or the processing module 901 and/or the transmitting module 907 may be operative, or configured, to transmit, on said first frequency, the first access identifier and the first access information compilation.

Figure 10:
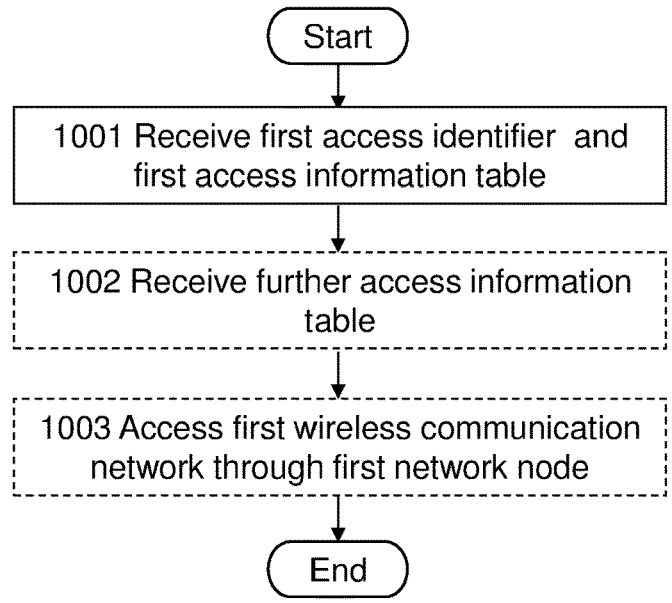
FIG. 10 is a flowchart schematically illustrating embodiments of a method performed in a wireless device.

FIG. 10 is a flow chart schematically illustrating embodiments of a method, performed by a wireless device, e.g. the wireless device 120, for obtaining access information enabling the wireless device 120 to access a first wireless communication network, e.g. the first wireless communication network 100, through a first radio network node, e.g., the first radio network node 110. The first radio network node 110 being comprised in the first wireless communication network 100.

The method comprises the following actions, which actions may be taken in any suitable order and/or be carried out fully or partly overlapping in time when this is possible and suitable.

Action 1001

The wireless device 120 receives, from the first radio network node 110, a first access identifier and a first access information compilation which are transmitted on a first frequency by the first radio network node 110. The first access identifier identifies the first access information compilation. The first access information compilation identifies access information that enables the wireless device 120 to access the first wireless communication network 100 through the first radio network node 110. The first access information compilation identifies where to receive another, further access information compilation that comprises at least part of said access information and is associated with a transmission on a different frequency and/or at a different time than the first access information compilation.

In some embodiments, the first access identifier, in addition to identifying the first access information compilation, functions as a time synchronization reference for wireless devices, e.g. the wireless device 120, attempting to access the first wireless communication network 100 through the first radio network node 110.

The first access information compilation may identify where to receive the further access information compilation by comprising information on:
which frequency the further access information compilation is being transmitted on, and/or
a time when the further access information compilation is being transmitted.

Moreover, the first access information compilation may further identify information facilitating accessing the further access information compilation. This information may comprise one or more parameters relating to one or more of the following:
a coding scheme used for the transmission of the further access information compilation,
a demodulation reference signal for use in demodulating a signal comprising the further access information compilation,
a time synchronization reference signal for use in accessing the further access information compilation,
a RAT associated with provision of the further access information compilation.

In some embodiments, the further access information compilation additionally comprises at least part of other access information. The other access information enabling the wireless device 120 to access the first wireless communication network 100 and/or another, second wireless communication network 101, through one or more other frequencies and/or radio network nodes, e.g. the second and/or third radio network nodes 111, 112. The further access information compilation thus provides access information associated with multiple frequencies and/or radio network nodes.

In some embodiments, said further access information compilation is transmitted on the same frequency as an access information compilation identifying how to access the further access information compilation.

Further, in some embodiments, said first access information compilation and the further access information compilation are periodically transmitted, the further access information compilation with a substantially longer periodicity.

Moreover, in some embodiments, the first access information compilation is transmitted based on information when the further access information compilation is transmitted, or the further access information compilation is transmitted based on information when the first access information compilation is transmitted.

Furthermore, in some embodiments, the first access information compilation and/or the further access information compilation may identify one or more additional access information compilations.

Said one or more additional access information compilations may comprise partial information of the first access information compilation and/or the further access information compilation.

At least some of said one or more additional access information compilations may be specific for one or more operators of the first wireless communication network 100 and/or the second wireless communication network 101.

At least some of said one or more additional access information compilations may be associated with another RAT than the first wireless communication network 100.

The first access information compilation and/or the further access information compilation may, by means of at least some of said one or more additional access information compilations, be associated with one or more further wireless communication networks, e.g. the second wireless communication network 101 and/or further radio network nodes, e.g. the second and/or third radio network nodes 111, 112. The wireless device 120 is thereby enabled to evaluate alternatives before accessing the first wireless communication network 100 through the first radio network node 110.

This action may fully or partly correspond to Action 302 above.

Action 1002

The wireless device 120 may receive, based on the received first access information compilation, the further access information compilation.

This action may fully or partly correspond to Action 303 above.

Action 1003

The wireless device 120 may access, based on the received further access information compilation, the first wireless communication network 100 through the first radio network node 110.

This action may fully or partly correspond to Action 305 above.

Figure 11:
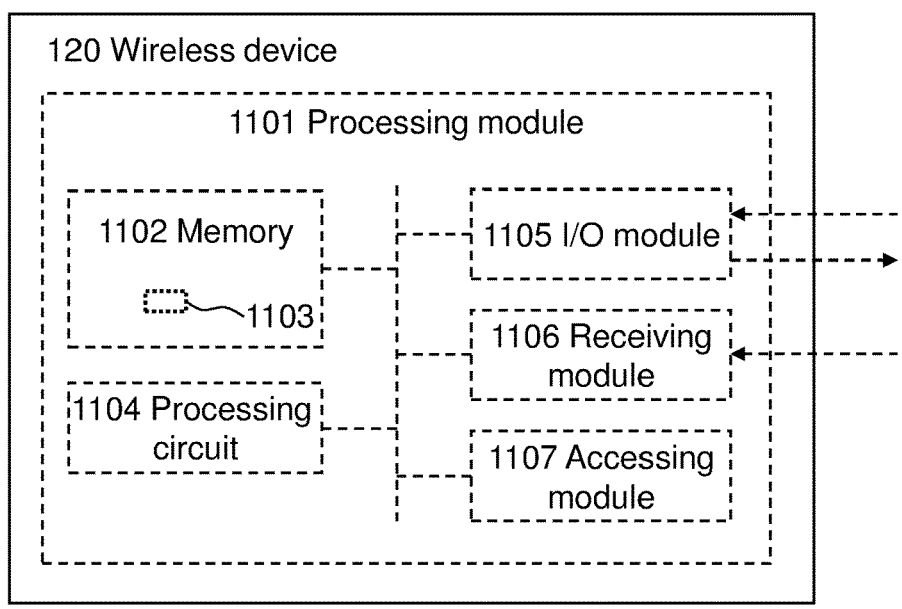
FIG. 11 is a functional block diagram for illustrating embodiments of the wireless device.

FIG. 11 is a schematic block diagram for illustrating embodiments of the wireless device 120 for obtaining access information enabling the wireless device 120 to access the first wireless communication network 100 through the first radio network node 110, in particular how the wireless device may be configured to perform the method and actions discussed above in connection with FIG. 10.

The wireless device 120 may comprise a processing module 1101, such as a means, one or more hardware modules, including e.g. one or more processors, and/or one or more software modules for performing said methods and/or actions.

The wireless device 120 may further comprise a memory 1102 that may comprise, such as contain or store, a computer program 1103. The computer program comprises 'instructions' or 'code' directly or indirectly executable by the wireless device 120 so that it performs the said methods and/or actions. The memory 1102 may comprise one or more memory units and may be further be arranged to store data, such as configurations and/or applications involved in or for performing functions and actions of embodiments herein.

Moreover, the wireless device 120 may comprise a processing circuit 1104 as an exemplifying hardware module and may comprise or correspond to one or more processors. In some embodiments, the processing module 1101 may comprise, e.g. 'is embodied in the form of' or 'realized by' the processing circuit 1104. In these embodiments, the memory 1102 may comprise the computer program 1103 executable by the processing circuit 1104, whereby the wireless device 120 is operative, or configured, to perform said method and/or actions.

Typically the wireless device 120, e.g. the processing module 1101, comprises an Input/Output (I/O) module 1105, configured to be involved in, e.g. by performing, any communication to and/or from other units and/or nodes, such as sending and/or receiving information to and/or from other external nodes or devices. The I/O module 1105 may be exemplified by an obtaining, e.g. receiving, module and/or a providing, e.g. sending, module, when applicable.

In further embodiments, the wireless device 120, e.g. the processing module 1101, may comprise one or more of an receiving module 1106 and an accessing module 1107, as exemplifying hardware and/or software module(s). In some embodiments, the receiving module 1106 and the accessing module 1109 may be fully or partly implemented by the processing circuit 1104.

Therefore, according to the various embodiments described above, the wireless device 120, and/or the processing module 1101 and/or the receiving module 1106 are operative, or configured, to receive, from the first radio network node 110, said first access identifier and said first access information compilation which are transmitted on said first frequency by the first radio network node 110.

Further, according to the various embodiments described above, the wireless device 120, and/or the processing module 1101 and/or the receiving module 1106, may be further operative, or configured, to receive, based on the received first access information compilation, said further access information compilation.

Moreover, according to the various embodiments described above, the wireless device 120, and/or the processing module 1101 and/or the accessing module 1107 may be operative, or configured, to access, based on the received further access information compilation, the first wireless communication network 100 through the first radio network node 110.

Figure 12A:
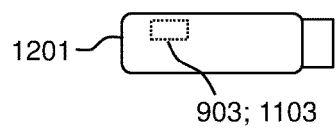
FIGS. 12a-c are schematic drawings illustrating embodiments relating to computer program products and computer programs to cause the first network node and the wireless device to perform method actions.
Figure 12B:
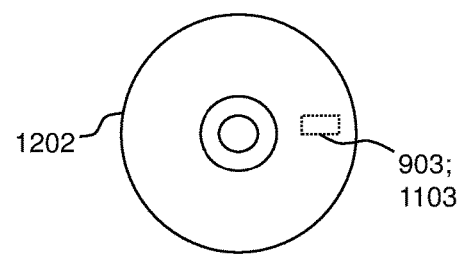
Figure 12C:
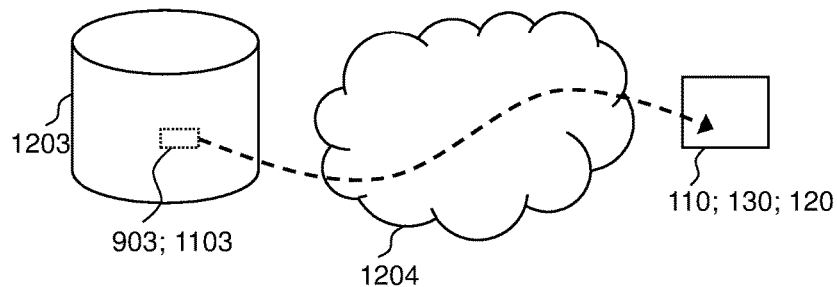

FIGS. 12*a-c* are schematic drawings illustrating embodiments relating to a computer program that may be any one of the computer programs 903, 1103 and that comprises instructions that when executed by the processing circuits 904, 1104, respectively and/or the processing modules 901, 1101 respectively, causes the first network node, e.g. the first radio network node 110 or further network node 130, and/or the wireless device 120 to perform as described above. The first radio network node 110 will be used to exemplify the first network node in the following, but may where suitable be replaced by the further network node 130 that is also an example of the first network node.

In some embodiments there is provided a data carrier, e.g. a computer program product, comprising any one or both of the computer programs 903, 1103. The data carrier may be one of an electronic signal, an optical signal, a radio signal, and a computer readable medium. Any one, some or all of the computer programs 903, 1103 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 1201 as in FIG. 12*a*, a disc storage medium 1202 such as a CD or DVD as in FIG. 12*b*, a mass storage device 1203 as in FIG. 12*c*. The mass storage device 1203 is typically based on hard drive(s) or Solid State Drive(s) (SSD). The mass storage device 1203 may be such that is used for storing data accessible over a computer network 1204, e.g. the Internet or a Local Area Network (LAN).

Any one, some or all of the computer programs 903, 1103 may furthermore be provided as a pure computer program or comprised in a file or files. The file or files may be stored on the computer-readable medium and e.g. available through download e.g. over the computer network 1204, such as from the mass storage device 1203 via a server. The server may e.g. be a web or File Transfer Protocol (FTP) server. The file or files may e.g. be executable files for direct or indirect download to and execution on the first radio network node 110 and/or the wireless device 120, e.g. by any one or both of the processing circuits 904, 1104. The file or files may also or alternatively be for intermediate download and compilation involving the same or another processor to make them executable before further download and execution causing the first radio network node 110 and/or the wireless device 120 to perform the method(s) as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first radio network node 110 or the further network node 130, and/or the wireless device 120 to be configured to and/or to perform the above-described methods, respectively.

Many details of examples above relate to presently is named 5G and some to LTE, i.e. are in a particular RAT context, and/or may have a specific meaning in such context, as recognized by the skilled person. However, embodiments herein are not limited to only such context(s) as used in the examples.

The term "network node" as used herein may as such refer to any type of radio network node (described above) or any network node, which may communicate with at least a radio network node. Examples of such network nodes include any radio network node stated above, a core network node, Operations & Maintenance (O&M), Operations Support Systems (OSS), Self Organizing Network (SON) node etc.

The term "node" as used herein may be used for the sake of simplicity, in order to denote a node which may be a network node, a radio network node or even a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the present disclosure, which is defined by the appending claims.

The invention claimed is:

1. A method, performed by a first network node, for providing access information enabling a wireless device to access a first wireless communication network through a first radio network node comprised in the first wireless communication network, wherein the method comprises:
    providing a first access identifier and a first access information compilation, the first access identifier identifying the first access information compilation, and the first access information compilation identifying where to receive another, further access information compilation that comprises at least part of the access information and is associated with a transmission on a different frequency than the first access information compilation, and wherein the first access information compilation identifies where to receive the further access information compilation by indicating the frequency used for transmitting the further access information compilation.

2. The method as claimed in claim 1, wherein the first network node is the first radio network node and wherein providing the first access identifier and the first access information compilation comprises:
    transmitting, on a first frequency, the first access identifier and the first access information compilation.

3. The method as claimed in claim 1, wherein the first access identifier, in addition to identifying the first access information compilation, functions as a time synchronization reference for wireless devices attempting to access the first wireless communication network through the first radio network node.

4. The method as claimed in claim 1, wherein the first access information compilation further identifies a time when the further access information compilation is being transmitted.

5. The method as claimed in claim 1, wherein the first access information compilation further identifies one or more of the following:
    a coding scheme used for transmission of the further access information compilation, a demodulation reference signal for use in demodulating a signal comprising the further access information compilation, a time synchronization reference signal for use in accessing the further access information compilation, and a Radio Access Technology (RAT) associated with the provision of the further access information compilation.

6. The method as claimed in claim 1, wherein the further access information compilation additionally comprises at least part of other access information enabling the wireless device to access the first wireless communication network and/or another, second wireless communication network, through one or more other frequencies and/or radio network nodes, the further access information compilation thus providing access information associated with multiple frequencies and/or radio network nodes.

7. The method as claimed in claim 1, wherein the first access information compilation comprises a portion of the access information and a pointer to the further access information compilation, and wherein the further access information compilation comprises a further portion of the access information.

8. A method, performed by a wireless device, for obtaining access information enabling the wireless device to access a first wireless communication network through a first radio network node, the first radio network node being comprised in the first wireless communication network, wherein the method comprises:

receiving, from the first radio network node, a first access identifier and a first access information compilation that are transmitted on a first frequency by the first radio network node, the first access identifier identifying the first access information compilation, the first access information compilation identifying where to receive another, further access information compilation that comprises at least part of the access information and is associated with a transmission on a different frequency than the first access information compilation, and wherein the first access information compilation identifies where to receive the further access information compilation by indicating the frequency used for transmitting the further access information compilation.

9. The method as claimed in claim 8, wherein the method further comprises:

receiving, based on the received first access information compilation, the further access information compilation.

10. The method as claimed in claim 9, wherein the method further comprises:

accessing, based on the received further access information compilation, the first wireless communication network through the first radio network node.

11. A first network node configured for providing access information enabling a wireless device to access a first wireless communication network through a first radio network node comprised in the first wireless communication network, wherein the first network node comprises:

communication circuitry; and processing circuitry configured to:

provide, via the communication circuitry, a first access identifier and a first access information compilation, the first access identifier identifying where to receive another, further access information compilation that comprises at least part of the access information and is associated with a transmission on a different frequency than the first access information compilation, and wherein the first access information compilation identifies where to receive the further access information compilation by indicating the frequency used for transmitting the further access information compilation.

12. The first network node as claimed in claim 11, wherein the first network node is the first radio network node and wherein, via the communication circuitry, the processing circuitry is configured to transmit, on a first frequency, the first access identifier and the first access information compilation.

13. The first network node as claimed in claim 11, wherein the first access identifier, in addition to identifying the first access information compilation, functions as a time synchronization reference for wireless devices attempting to access the first wireless communication network through the first radio network node.

14. The first network node as claimed in claim 11, wherein the first access information compilation further identifies a time when the further access information compilation is being transmitted.

15. The first network node as claimed in claim 11, wherein the first access information compilation further identifies one or more of the following:

a coding scheme used for transmission of the further access information compilation, a demodulation reference signal for use in demodulating a signal comprising the further access information compilation, a time synchronization reference signal for use in accessing the further access information compilation, and a Radio Access Technology (RAT) associated with the provision of the further access information compilation.

16. The first network node as claimed in claim 11, wherein the further access information compilation additionally comprises at least part of other access information enabling the wireless device to access the first wireless communication network and/or another, second wireless communication network, through one or more other frequencies and/or radio network nodes, the further access information compilation thus providing access information associated with multiple frequencies and/or radio network nodes.

17. The first network node as claimed in claim 11, wherein the first access information compilation comprises a portion of the access information and a pointer to the further access information compilation, and wherein the further access information compilation comprises a further portion of the access information.

18. The first network node as claimed in claim 11, wherein the first access information compilation and the further access information compilation are periodically transmitted, the further access information compilation being transmitted with a substantially longer periodicity than the first access information compilation.

19. The first network node as claimed in claim 11, wherein the first access information compilation is transmitted based on information when the further access information compilation is transmitted, or the further access information compilation is transmitted based on information when the first access information compilation is transmitted.

20. The first network node as claimed in claim 11, wherein the first access information compilation and/or the further access information compilation identifies one or more additional access information compilations.

21. The first network node as claimed in claim 20, wherein the one or more additional access information compilations comprise partial information of the first access information compilation and/or the further access information compilation.

22. The first network node as claimed in claim 20, wherein at least some of the one or more additional access information compilations are specific for one or more operators of the first wireless communication network and/or the second wireless communication network.

23. The first network node as claimed in claim 20, wherein at least some of the one or more additional access information compilations are associated with another Radio Access Technology (RAT) than the first wireless communication network.

24. A wireless device configured for obtaining access information enabling the wireless device to access a first wireless communication network through a first radio network node, the first radio network node being comprised in the first wireless communication network, wherein the wireless device comprises:
communication circuitry configured for communicating with the first radio network node; and
processing circuitry operatively associated with the communication circuitry and configured to:
receive, from the first radio network node, a first access identifier and a first access information compilation that are transmitted on a first frequency by the first radio network node, the first access identifier identifying where to receive another, further access information compilation that comprises at least part of the access information and is associated with a transmission on a different frequency than the first access information compilation, and wherein the first access information compilation identifies where to receive the further access information compilation by indicating the frequency used for transmitting the further access information compilation.

25. The wireless device as claimed in claim 24, wherein the processing circuitry is configured to:
receive, based on the received first access information compilation, the further access information compilation.

26. The wireless device as claimed in claim 25, wherein the processing circuitry is configured to:
access, based on the received further access information compilation, the first wireless communication network through the first radio network node.

27. The wireless device as claimed in claim 25, wherein the first access information compilation comprises a portion of the access information and the further access information compilation comprises a further portion of the access information, and wherein the processing circuitry is configured to determine the access information as a combination of the portion comprised in the first access information compilation and the further portion comprised in the further access information compilation.

28. The method as claimed in claim 8, wherein the first access information compilation comprises a portion of the access information and the further access information compilation comprises a further portion of the access information, and wherein the method includes the wireless device determining the access information as a combination of the portion comprised in the first access information compilation and the further portion comprised in the further access information compilation.

29. The method as claimed in claim 1, wherein the first access information compilation is not specific to any given network operator and the further access information compilations is operator-specific.

30. The method as claimed in claim 1, wherein the at least part of the access information comprised in the further access information compilation is common to at least one of: multiple radio network nodes, multiple radio frequencies, or multiple network operators.

31. The first network node as claimed in claim 11, wherein the first access information compilation is not specific to any given network operator and the further access information compilations is operator-specific.

32. The first network node as claimed in claim 11, wherein the at least part of the access information comprised in the further access information compilation is common to at least one of: multiple radio network nodes, multiple radio frequencies, or multiple network operators.

* * * * *